US009603111B2

(12) United States Patent
Harada et al.

(10) Patent No.: US 9,603,111 B2
(45) Date of Patent: Mar. 21, 2017

(54) RADIO COMMUNICATION SYSTEM AND COMMUNICATION CONTROL METHOD

(71) Applicant: NTT DOCOMO, INC., Tokyo (JP)

(72) Inventors: Hiroki Harada, Tokyo (JP); Satoshi Nagata, Tokyo (JP); Yoshihisa Kishiyama, Tokyo (JP); Yukihiko Okumura, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 91 days.

(21) Appl. No.: 14/759,257

(22) PCT Filed: Oct. 22, 2013

(86) PCT No.: PCT/JP2013/078531
§ 371 (c)(1),
(2) Date: Jul. 6, 2015

(87) PCT Pub. No.: WO2014/109105
PCT Pub. Date: Jul. 17, 2014

(65) Prior Publication Data
US 2016/0088579 A1    Mar. 24, 2016

(30) Foreign Application Priority Data

Jan. 9, 2013  (JP) .................................. 2013-001826
May 9, 2013  (JP) .................................. 2013-099391

(51) Int. Cl.
*H04W 56/00*  (2009.01)
*H04W 48/10*  (2009.01)
*H04W 48/16*  (2009.01)

(52) U.S. Cl.
CPC ....... *H04W 56/0015* (2013.01); *H04W 48/10* (2013.01); *H04W 48/16* (2013.01)

(58) Field of Classification Search
CPC .. H04W 56/0015; H04W 48/16; H04W 48/10
(Continued)

(56) References Cited

U.S. PATENT DOCUMENTS

2009/0316659 A1    12/2009  Lindoff et al.
2011/0256868 A1*   10/2011  Nogami ............... H04J 11/0069
                                                  455/435.1
2013/0044686 A1*   2/2013   Yen ........................ H04W 56/00
                                                  370/328

FOREIGN PATENT DOCUMENTS

JP    2009-188612 A    8/2009

OTHER PUBLICATIONS

International Search Report issued in corresponding PCT Application No. PCT/JP2013/078531 mailed Jan. 21, 2014 (1 page).
(Continued)

*Primary Examiner* — Obaidul Huq
(74) *Attorney, Agent, or Firm* — Osha Liang LLP

(57) ABSTRACT

A radio communication system includes a first base station that is identified by a first cell identity, a second base station that is identified by a second cell identity, and a user device that can perform radio communication with each of the base stations. The user device detects a first transmission timing based on a first synchronization signal from the first base station and establishes synchronization with the first base station. The first base station notifies the user device of synchronization state information related to a synchronization state with the second base station and of frequency information related to an identification signal frequency that is used by the second base station to transmit an identification signal. The user device, based on the synchronization state information, performs identifying processing, on the identification signal frequency indicated by the frequency information, to identify the second cell identity indicated by the identification signal.

10 Claims, 12 Drawing Sheets

(58) Field of Classification Search
USPC .................................. 370/310, 328, 329, 336
See application file for complete search history.

(56) References Cited

OTHER PUBLICATIONS

3GPP TS 36.211 V10.1.0; "3rd Generation Partnership Project; Technical Specification Group Radio Access Network; Evolved Universal Terrestrial Radio Access (E-UTRA); Physical Channels and Modulation (Release 10), Chapter 6.11, Synchronization signals"; pp. 75-92; Mar. 2011 (19 pages).
3GPP TS 36.211 V10.1.0; "3rd Generation Partnership Project; Technical Specification Group Radio Access Network; Evolved Universal Terrestrial Radio Access (E-UTRA); Physical Channels and Modulation (Release 10), Chapter 6.11, Reference signals"; pp. 92-96; Mar. 2011 (6 pages).
Extended European Search Report in counterpart European Application No. 13870740.1 issued Jan. 7, 2016 (8 pages).

\* cited by examiner

| GROUP IDENTITY (SSS) | LOCAL IDENTITY (PSS) |
|---|---|
| 0 | 0 |
|  | 1 |
|  | 2 |
| 1 | 0 |
|  | 1 |
|  | 2 |
| 2 | 0 |
|  | 1 |
|  | 2 |
| ⋮ | ⋮ |
| 167 | 0 |
|  | 1 |
|  | 2 | ns

RADIO COMMUNICATION SYSTEM AND COMMUNICATION CONTROL METHOD

TECHNICAL FIELD

The present invention relates to radio communication systems and to communication control methods.

BACKGROUND ART

A variety of radio communication systems that operate in accordance with 3GPP (Third Generation Partnership Project) protocols are used. In a radio communication system that operates in accordance with LTE/SAE (Long Term Evolution/System Architecture Evolution) protocol in the 3GPP protocols, a user device performs cell searching to establish synchronization with a macro base station so as to perform radio communication. In performing cell searching, the user device, by calculating correlations between a synchronization signal transmitted by the macro base station and a replica signal stored in the user device, detects a transmission timing of the synchronization signal and a physical cell identity (PCI) so as to recognize (identify) the macro base station.

RELATED ART DOCUMENT

Patent Document

Patent Document 1: Japanese Patent Application Laid-Open Publication No. 2009-188612

SUMMARY OF THE INVENTION

Problem to be Solved by the Invention

The radio communication system above is assumed to include a new type of base station (hereinafter referred to as a small base station) that performs radio communication using a frequency band (e.g., 3.5 GHz band) that is different from a frequency band that the macro base station uses (e.g., 2 GHz band) to perform radio communication. In a configuration in which the user device performs cell searching in the frequency band used by the macro base station and in the frequency band used by the small base station, compared with a configuration in which the user device performs cell searching in a single frequency band, a processing load on the user device to perform correlation calculations, etc. is large, and therefore, the power consumption of the user device is large.

In light of the situation described above, it is an object of the present invention to reduce a processing load on a user device to recognize base stations in a radio communication system that includes multiple base stations.

Means Of Solving The Problems

A radio communication system according to the present invention includes: base stations that include a first base station and a second base station, the first base station performing radio communication using a first frequency band and being identified by a first cell identity, the second base station performing radio communication using a second frequency band and being identified by a second cell identity; and a user device that performs radio communication with each of the base stations. The first base station includes: a first transmitting unit that transmits, at a first transmission timing, a first synchronization signal that indicates the first cell identity, which identifies the first base station. The second base station includes: a second transmitting unit that transmits an identification signal that indicates the second cell identity, which identifies the second base station. The user device includes: a cell searcher that detects the first transmission timing based on the first synchronization signal received from the first base station and performs timing-search processing that establishes synchronization with the first base station. The first base station further includes: an information notifying unit that notifies the user device of synchronization state information related to a synchronization state between the first base station and the second base station and of frequency information related to an identification signal frequency that the second base station uses to transmit the identification signal, the identification signal frequency being included in the second frequency band. The cell searcher of the user device, based on the synchronization state information from the first base station, performs identifying processing on the identification signal frequency indicated by the frequency information to identify the second cell identity indicated by the identification signal.

Preferably, the first base station and the second base station are synchronized with each other to perform radio communication. The second transmitting unit of the second base station transmits a second synchronization signal at a second transmission timing. The synchronization state information, which is notified by the information notifying unit of the first base station, indicates whether the first base station and the second base station are synchronized. When the synchronization state information indicates that the first base station and the second base station are synchronized, the cell searcher of the user device, without performing timing-search processing for the second base station, performs identifying processing, based on the first transmission timing, to identify the second cell identity indicated by the identification signal.

Preferably, the first base station and the second base station are synchronized with each other to perform radio communication. The second transmitting unit of the second base station transmits a second synchronization signal at a second transmission timing. The synchronization state information, which is notified by the information notifying unit of the first base station, indicates whether the first base station and the second base station are synchronized. When the synchronization state information indicates that the first base station and the second base station are synchronized, the cell searcher of the user device identifies the second transmission timing by performing timing-search processing for the second base station over a predetermined period that includes the first transmission timing and performs identifying processing based on the second transmission timing to identify the second cell identity indicated by the identification signal.

Preferably, the second transmitting unit of the second base station further transmits a cell-specific signal that includes the identification signal and is different from the second synchronization signal, and the cell searcher of the user device performs identifying processing to identify the second cell identity indicated by the identification signal included in the cell-specific signal.

Preferably, the information notifying unit of the first base station transmits, to the user device UE, configuration information that indicates a transmission timing of the cell-specific signal and information on a CP length in radio communication performed by the second base station. The cell searcher of the user device, further using the configuration information and the information on the CP length, performs identifying processing to identify the second cell identity indicated by the identification signal included in the cell-specific signal.

Preferably, the second transmitting unit of the second base station transmits a second synchronization signal that includes the identification signal at the second transmission timing, the second transmission timing being a timing that is delayed from the first transmission timing at the first base station by a length of time that corresponds to a transmission offset value. The synchronization state information, which is notified by the information notifying unit of the first base station, indicates the transmission offset value for the first transmission timing at the first base station. The cell searcher of the user device, without performing timing-search processing for the second base station, performs identifying processing, based on the first transmission timing and the transmission offset value indicated by the synchronization state information, to identify the second cell identity indicated by the identification signal.

The second transmitting unit of the second base station transmits a second synchronization signal that includes the identification signal at the second transmission timing, the second transmission timing being a timing that is delayed from the first transmission timing at the first base station by a length of time that corresponds to a transmission offset value. The synchronization state information, which is notified by the information notifying unit of the first base station, indicates the transmission offset value for the first transmission timing at the first base station. The cell searcher of the user device identifies the second transmission timing by performing timing-search processing for the second base station over a predetermined period that includes a transmission timing that is delayed from the first transmission timing by the length of time that corresponds to the transmission offset value indicated by the synchronization state information and performs identifying processing based on the second transmission timing to identify the second cell identity indicated by the identification signal.

Preferably, the second base station further includes: a received power measuring unit that measures received power of radio signals received from the first base station; and an offset value setter that sets a transmission offset value so that the transmission offset value increases as the received power measured by the received power measuring unit decreases. The second transmitting unit of the second base station transmits a second synchronization signal that includes the identification signal at the second transmission timing, the second transmission timing being a timing that is advanced from the first transmission timing at the first base station by a length of time that corresponds to the transmission offset value. The synchronization state information, which is notified by the information notifying unit of the first base station, indicates whether the first base station and the second base station are synchronized. When the synchronization state information indicates that the first base station and the second base station are synchronized, the cell searcher of the user device, without performing timing-search processing for the second base station, performs identifying processing based on the first transmission timing to identify the second cell identity indicated by the identification signal.

Preferably, the synchronization state information further includes an identity list that indicates second cell identities that correspond to second base stations, and the cell searcher of the user device performs the identifying processing only for the second base stations, which correspond to the second cell identities indicated by the identity list.

Preferably, the user device further includes a terminal transmitting unit that transmits a terminal discovery signal that indicates a terminal identifier that identifies the user device, and the second transmitting unit of the second base station transmits the identification signal that has a common signal format with the terminal discovery signal.

Preferably, the second transmitting unit of the second base station transmits the identification signal in accordance with an identification signal pattern, the identification signal pattern indicating a configuration of the identification signal in each of the subframes and identifying the second base station.

A communication control method according to the present invention is used in a radio communication system that includes: base stations that include a first base station and a second base station, the first base station performing radio communication using a first frequency band and being identified by a first cell identity, the second base station performing radio communication using a second frequency band and being identified by a second cell identity; and a user device that performs radio communication with each of the base stations. The communication control method includes: in the first base station, transmitting, at a first transmission timing, a first synchronization signal that indicates the first cell identity, which identifies the first base station, in the second base station, transmitting an identification signal that indicates the second cell identity, which identifies the second base station, in the user device, detecting the first transmission timing based on the first synchronization signal received from the first base station and performing timing-search processing that establishes synchronization with the first base station, in the first base station, notifying the user device of synchronization state information related to a synchronization state between the first base station and the second base station and of frequency information related to an identification signal frequency that the second base station uses to transmit the identification signal, the identification signal frequency being included in the second frequency band, and in the user device, using the synchronization state information from the first base station, performing identifying processing on the identification signal frequency indicated by the frequency information to identify the second cell identity included in the identification signal.

Effect of the Invention

According to the present invention, the user device performs identifying processing to identify the second cell identity indicated by the second synchronization signal transmitted by the second base station based on the frequency information and the synchronization state information notified by the first base station. Because timing-search processing for the small base station PhNB is omitted, a processing load on the user device UE to recognize the small base station PhNB is reduced.

MODES FOR CARRYING OUT THE INVENTION

1. First Embodiment

1(1). Outline of Radio Communication System

Figure 1:
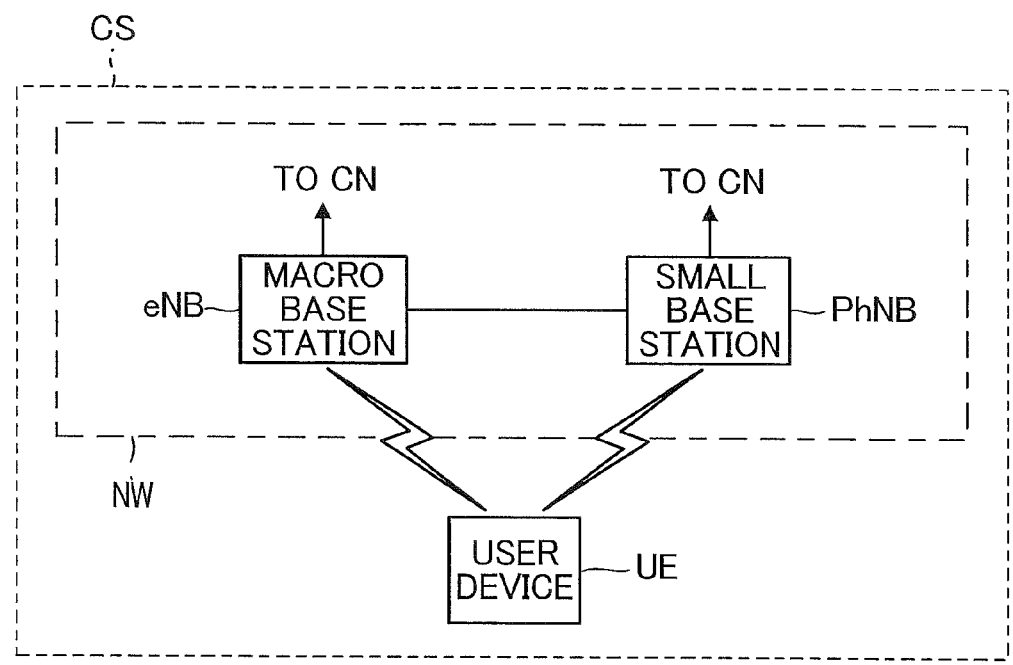
FIG. 1 is a block diagram showing a radio communication system according to a first embodiment.

FIG. 1 is a block diagram showing a radio communication system CS according to a first embodiment of the present invention. The radio communication system CS includes, as its elements, a macro base station eNB, a small base station PhNB, and a user device UE. The radio communication system CS may include, in addition to the elements above, other elements not shown in the figure, for example, a switching center, a serving gateway, and a PDN gateway, etc. A network NW includes the above-mentioned elements that the radio communication system CS includes, except for the user device UE.

Each element in the radio communication system CS performs communication in accordance with a predetermined access technology, e.g., LTE/SAE (Long Term Evolution/System Architecture Evolution) protocol included in the 3GPP (Third Generation Partnership Project) protocols. In accordance with terms specified in the 3GPP protocols, the user device UE is a User Equipment, the macro base station eNB is an evolved Node B, the switching center is a Mobile Management Entity, the serving gateway is a Serving Gateway, and the PDN gateway is a Packet Data Network Gateway. The small base station PhNB is a new type of base station that performs radio communication using a frequency band that is different from a frequency band that the macro base station eNB uses (details below).

The user device UE can perform radio communication with the macro base station eNB and with the small base station PhNB. Each of the base stations (eNB and PhNB) is identified by a unique physical cell identity PCI. As described later, each of the base stations (eNB and PhNB) may be identified by a unique identification signal. A scheme for radio communication between the user device UE and each of the base stations (eNB and PhNB) can be freely chosen. For example, OFDMA (Orthogonal Frequency Division Multiple Access) may be adopted for downlink, whereas SC-FDMA (Single-Carrier Frequency Division Multiple Access) may be adopted for uplink. The macro base station eNB and the small base stations PhNB may perform radio communication using different schemes.

The macro base station eNB and the small base station PhNB are interconnected by a wired interface, such as optical fiber, that can transmit clock signals. The macro base station eNB and the small base station PhNB can synchronize with each other according to clock signals. Clock signals may be generated at one of the base stations (preferably at the macro base station eNB) to be transmitted to the other base station. Alternatively, clock signals to be transmitted to the base stations may be generated at a clock generator (not shown in the figure) that is placed separately from the base stations.

The macro base station eNB and the small base station PhNB are connected to a core network. The core network is a packet communication network that includes the switching center, the serving gateway, and the PDN gateway, etc. The small base station PhNB may be connected to the core network by being routed through the macro base station eNB, instead of being connected directly to the core network.

Figure 2:
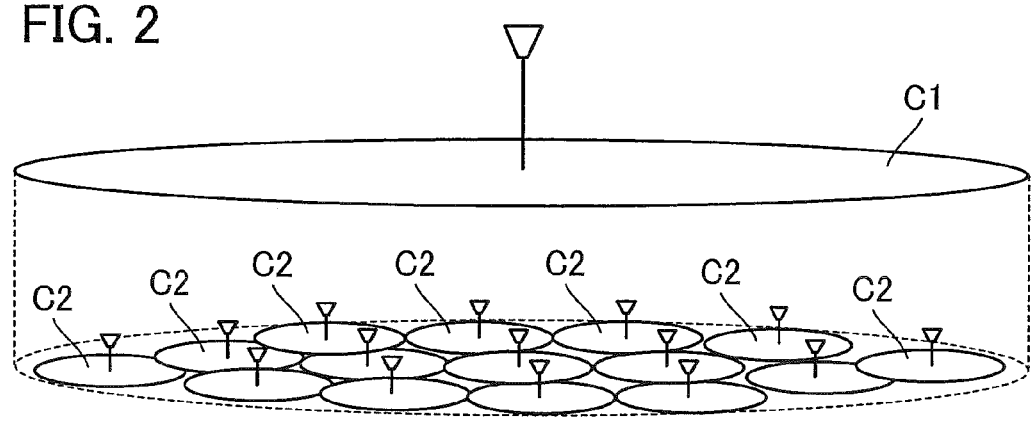
FIG. 2 is a diagram showing an example of cells that base stations form around themselves.

FIG. 2 shows an example of cells C that the base stations (eNB and PhNB) form around themselves. The macro base station eNB forms a macro cell C1 around it, and small base stations PhNB form small cells C2 around them. An antenna of each base station is schematically shown in each cell C. Although, for descriptive purposes, a plane on which the macro cell C1 is shown differs from a plane on which small cells C2 are shown, in reality, the macro cell C1 and the small cells C2 can be overlaid on the same plane, such as a land surface. A cell C of a base station is a range within which radio waves from the base station effectively reach a user device UE. The user device UE can, therefore, communicate by radio with the base station that corresponds to the cell C within which the user device UE resides.

Compared with a macro base station eNB, a small base station PhNB is smaller in scale and has lower radio transmitting capabilities (average transmitting power, maximum transmitting power, etc.). A frequency band that a small base station PhNB uses for radio communication (a second frequency band; e.g., 3.5 GHz band) is higher in frequency and has a greater propagation loss than a frequency band that a macro base station eNB uses for radio communication (a first frequency band; e.g., 2 GHz band). A small cell C2 is therefore smaller in area than a macro cell C1.

1(2). Radio Frame and Physical Cell Identity

Figure 3:
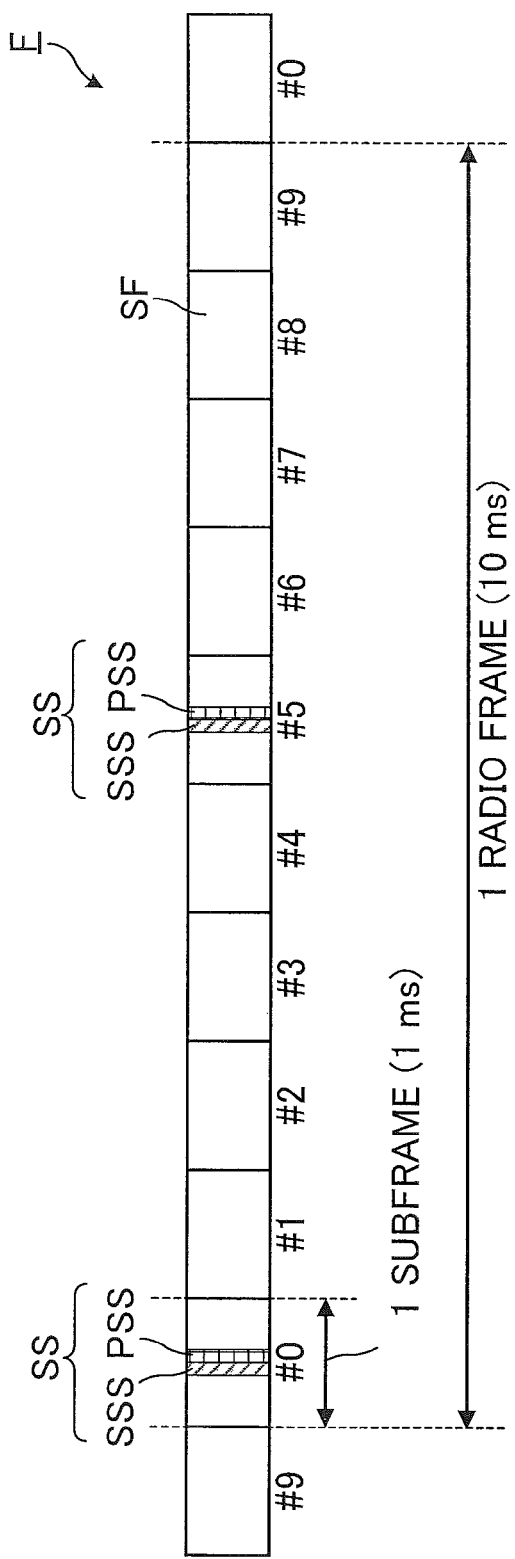
FIG. 3 is a diagram showing a format of a radio frame.

FIG. 3 is a diagram showing a format of a radio frame F that the macro base station eNB and the small base station PhNB each transmit. A variety of radio signals (control signals, user signals, etc.) are transmitted by the base stations (eNB and PhNB) using radio frames F. One radio frame F contains ten subframes SF. The time length of each subframe SF is 1 millisecond, and the time length of one radio frame F is therefore 10 milliseconds. Each subframe SF has one of subframe numbers that range from #0 to #9, the subframe numbers being assigned in rotation to subframes SF in the order of their transmission. A synchronization signal SS, which indicates a physical cell identity PCI, is transmitted in the first and the sixth subframes SF (SF#0 and SF#5) in a radio frame F. A synchronization signal SS is transmitted in a cycle of five subframes (i.e., every 5 milliseconds).

A physical cell identity PCI indicated by a synchronization signal SS is assigned to each base station (each cell), and is used for various kinds of processing, such as synchronization establishment, cell recognition, channel estimation, data scrambling, etc. (refer to 3GPP TS 36.211 V10.1.0 (2011-03), Chapter 6.11, Synchronization signals). A synchronization signal SS includes a PSS (Primary Synchronization Signal), which indicates a local identity of a cell, and an SSS (Secondary Synchronization Signal), which indicates a group identity of the cell. That is, a synchronization signal SS can serve as an identification signal.

Figures 4, 5:
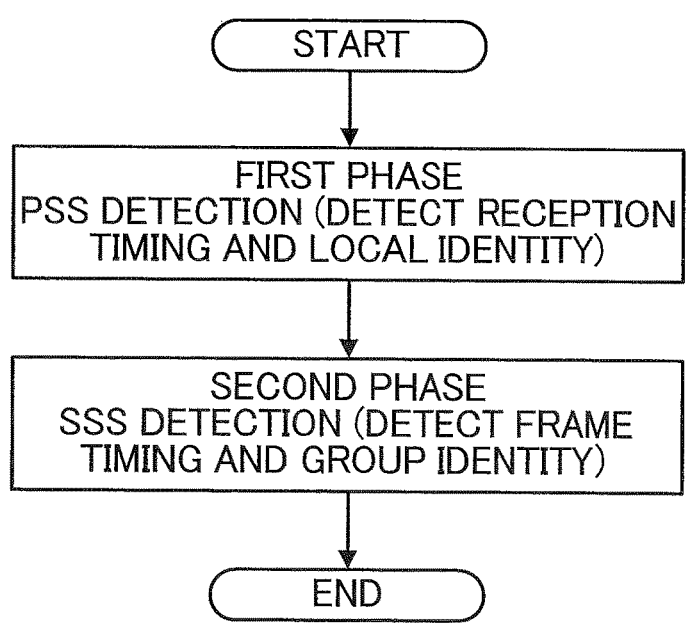
FIG. 4 is a table showing local identities and group identities included in physical cell identities.
FIG. 5 is a flow diagram schematically showing a flow of operations for synchronization establishment and cell recognition (cell searching) using synchronization signals.

FIG. 4 is a table showing local identities and group identities included in physical cell identities PCI. There are 168 types of group identities and 3 types of local identities. Because there are 3 types of local identities for each group identity, there are 504 (=168×3) types of physical cell identities PCI.

1(3). Synchronization Establishment and Cell Recognition (Cell Searching)

1(3)-1. Outline of Synchronization Establishment and Cell Recognition (Cell Searching) Using Synchronization Signals FIG. 5 is a flow diagram schematically showing a flow of operations for synchronization establishment and cell recognition (cell searching) using a synchronization signal SS (a PSS and an SSS). Cell searching includes processing in the first phase and that in the second phase. In the first phase, the user device UE calculates correlations between a radio signal received from a base station (e.g., the macro base station eNB) and PSS replica signals stored in the user device UE so as to detect the transmission timing (subframe timing) of a PSS included in the radio signal and the local identity. Hereinafter, processing to detect the transmission timing of PSS's (subframe timing) may be referred to as "timing-search processing".

In the second phase, the user device UE, based on the transmission timing detected in the first phase, calculates correlations between an SSS included in a received radio signal and SSS replica signals stored in the user device UE so as to detect the transmission timing (frame timing) of an SSS included in the radio signal and the group identity. By processing performed in the first phase and in the second phase, the local identity and the group identity, which are indicated by synchronization signals SS in received radio signals, are identified. As a result, the user device UE recognizes the physical cell identity PCI of the base station (eNB or PhNB) that transmits the synchronization signals SS.

In the first phase, because the user device UE does not know where in a received radio signal a synchronization signal SS is located, the user device UE calculates correlations over the entirety of the received radio signal. In the second phase, because the user device UE can, based on the transmission timing detected in the first phase, recognize the location of a synchronization signal SS (and therefore the location of an SSS) in a received radio signal, the user device UE calculates correlations only for the part that corresponds to the SSS in the received radio signal. The processing load for calculations in the first phase is therefore much greater than that in the second phase.

Figure 6:
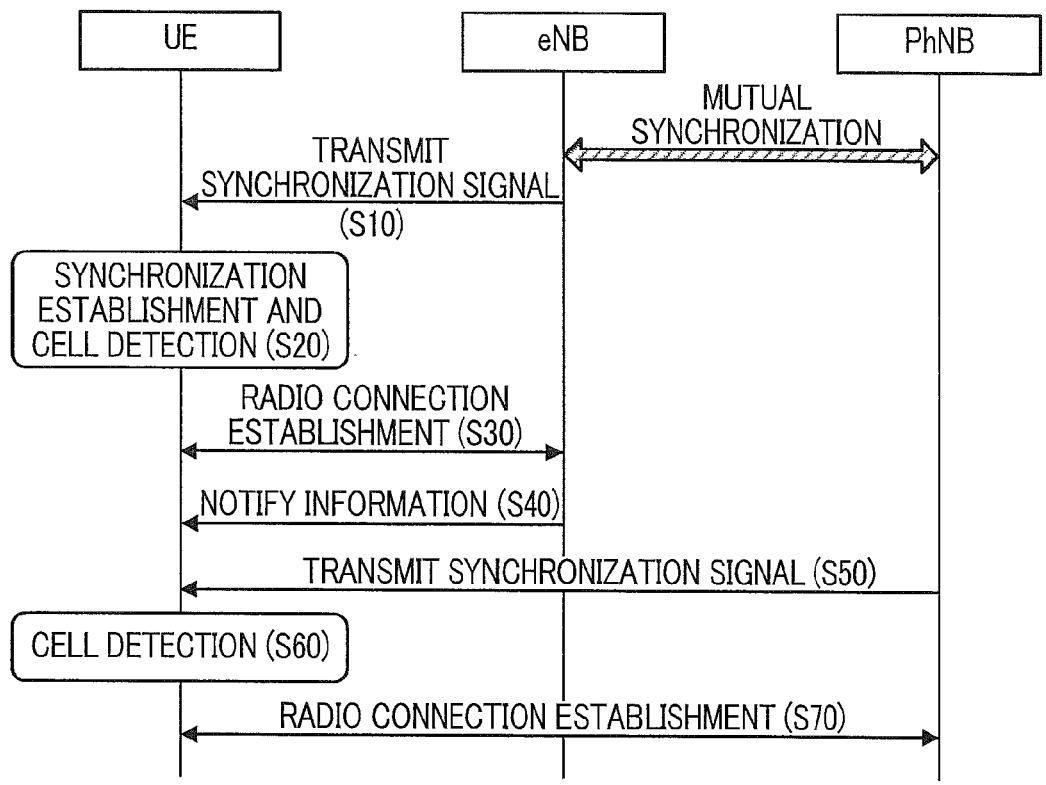
FIG. 6 is an operation flow showing an example of physical cell identity identifying processing according to the first embodiment.
Figure 7:
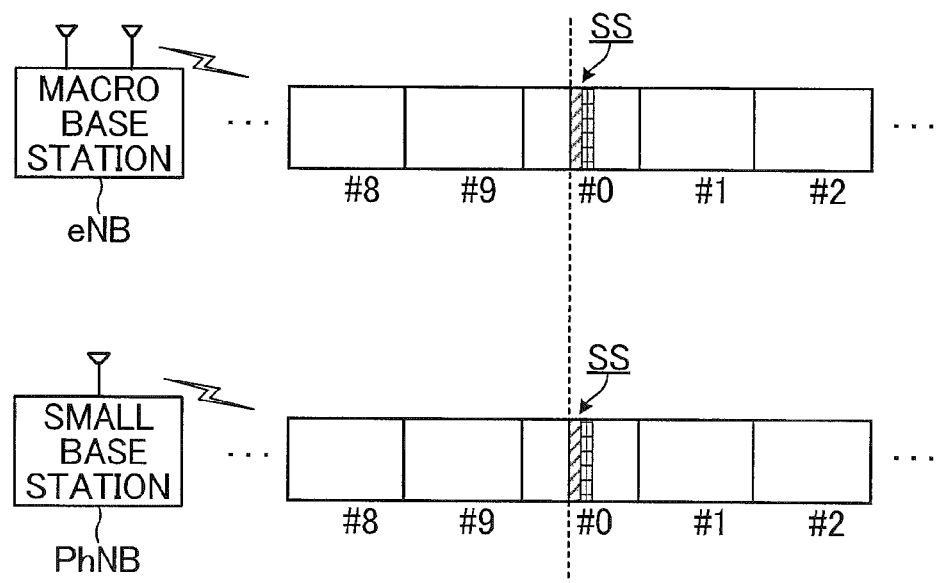
FIG. 7 is a diagram showing an example of radio signal transmission performed by a macro base station and a small base station according to the first embodiment.

1(3)-2. Small Base Station Cell Searching Using Transmission Timing at Macro Base Station With reference to FIGS. 6 and 7, identifying processing to identify the physical cell identity PCI of the small base station PhNB according to the present embodiment is described. FIG. 6 is an operation flow showing an example of the identifying processing to identify a physical cell identity PCI. FIG. 7 is a diagram showing an example of radio signal transmission performed by the macro base station eNB and the small base station PhNB that are synchronized with each other.

The macro base station eNB and the small base station PhNB of the first embodiment are, as stated above, synchronized with each other. That is, as shown in FIG. 7, there is no difference between a transmission timing at which the macro base station eNB transmits a synchronization signal SS and a transmission timing at which the small base station PhNB transmits a synchronization signal SS (or, the difference between the transmission timings is much smaller compared with the duration of a radio signal unit (resource element, etc.)).

The macro base station eNB periodically transmits a synchronization signal SS that indicates the physical cell identity PCI identifying the macro base station eNB at a transmission timing, such as the timings shown in FIGS. 3 and 7 (S10). The user device UE, based on synchronization signals SS received from the macro base station eNB, performs cell detection (processing to identify a physical cell identity PCI that indicates the macro base station eNB) and synchronization establishment with the macro base station eNB (S20). More specifically, as stated above, the user device UE detects the transmission timing of PSS's and the local identity based on a PSS included in a synchronization signal SS from the macro base station eNB (the first phase). The user device UE, based on an SSS included in a synchronization signal SS from the macro base station eNB, then detects the transmission timing of SSS's and the group identity so as to identify the transmission timing of synchronization signals SS and the physical cell identity PCI. The user device UE then establishes a radio connection with the macro base station eNB (S30).

The macro base station eNB notifies the user device UE of synchronization state information related to a synchronization state between the macro base station eNB and the small base station PhNB, which is located nearby, and of frequency information related to an identification signal frequency that the small base station PhNB uses to transmit synchronization signals SS (S40). In the first embodiment, because the macro base station eNB and the small base station PhNB are synchronized, the synchronization state information indicates that "the macro base station eNB and the small base station PhNB are synchronized". The user device UE stores the received synchronization state information and the received frequency information.

The small base station PhNB periodically transmits a synchronization signal SS that indicates the physical cell identity PCI identifying the small base station PhNB at a transmission timing, such as the timing shown in FIG. 7 (S50). The user device UE, based on synchronization signals SS received from the small base station PhNB, performs cell detection (processing to identify a physical cell identity PCI that indicates the small base station PhNB) (S60). The cell detection described immediately above is performed using the synchronization state information and the frequency information notified at step S40. More specifically, when the synchronization state information indicates that "the macro base station eNB and the small base station PhNB are synchronized", the user device UE, without performing timing-search processing for the small base station PhNB, performs, based on the transmission timing of synchronization signals SS transmitted by the macro base station eNB, detection processing to detect the local identity and the group identity, on the identification signal frequency that is indicated by the frequency information and is used by the small base station PhNB. The user device UE then establishes a radio connection with the small base station PhNB (S70).

In the cell detection at step S60, the user device UE does not need to search for the location (transmission timing) of a synchronization signal SS included in a radio signal from the small base station PhNB. That is, the user device UE can omit the first phase of cell searching. This is enabled by the fact that the user device UE can regard the transmission timing of synchronization signals SS at the macro base station eNB obtained at step S20 as the transmission timing of synchronization signals SS at the small base station PhNB to perform cell detection (calculate correlations with the replica signals) because the macro base station eNB and the small base station PhNB are synchronized, as stated above, and the macro base station eNB and the small base station PhNB use a common transmission timing to transmit synchronization signals SS.

1(4). Configuration of Each Element

1(4)-1. Configuration of User Device

Figure 8:
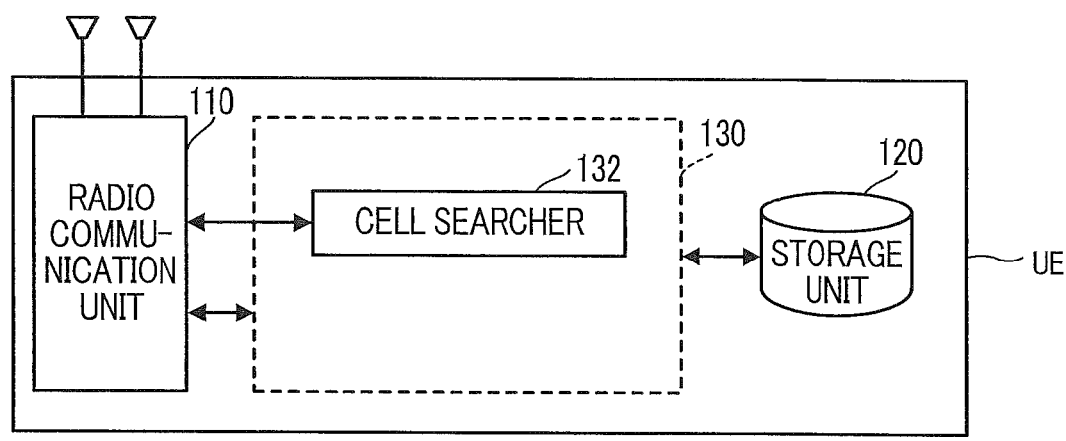
FIG. 8 is a block diagram showing a configuration of a user device according to the first embodiment.

FIG. 8 is a block diagram showing a configuration of the user device UE according to the first embodiment. The user device UE includes a radio communication unit 110, a storage unit 120, and a controller 130. In the figure, the illustrations of an output device for outputting audio, images, etc., and an input device for accepting instructions from a user are omitted for brevity. The radio communication unit 110 is an element for performing radio communication with the macro base station eNB and with the small base station PhNB. The radio communication unit 110 includes transceiving antennas, a receiving circuit for receiving radio signals (radio waves) and converting them to electrical signals, and a transmitting circuit for converting electrical signals, such as control signals and user signals, to radio signals (radio waves) and transmitting them. The storage unit 120 stores information related to communication control, in particular, the transmission timing of synchronization signals SS at a base station (e.g., eNB, PhNB) with which the user device UE has established synchronization, the synchronization state information, and the frequency information. The controller 130 exchanges user signals and control signals and includes a cell searcher 132. The cell searcher 132 performs the above-described types of cell searching; that is, the regular two-phased cell searching (FIG. 5) and cell searching for the small base station PhNB using the transmission timing at the macro base station eNB (FIG. 6, etc.). The controller 130 and the elements included in the controller 130 are functional blocks accomplished by the fact that a CPU (central processing unit; not shown in the figure), provided in the user device UE, executes a computer program stored in the storage unit 120 and operates in accordance with the computer program.

1(4)-2. Configuration of Macro Base Station

Figure 9:
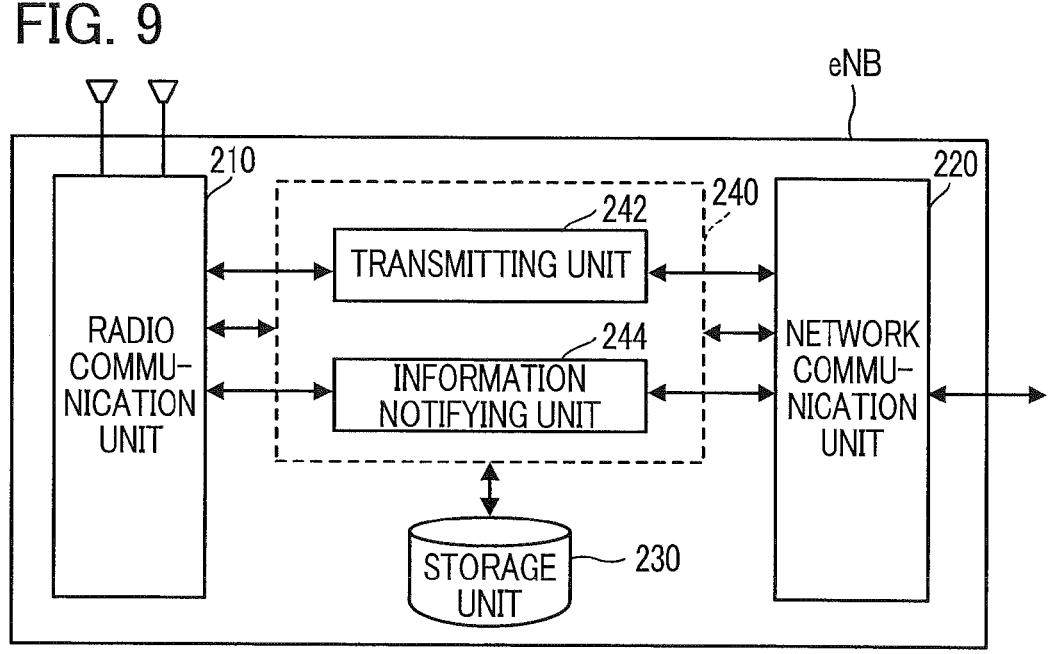
FIG. 9 is a block diagram showing a configuration of the macro base station according to the first embodiment.

FIG. 9 is a block diagram showing a configuration of the macro base station eNB according to the first embodiment. The macro base station eNB includes a radio communication unit 210, a network communication unit 220, a storage unit 230, and a controller 240. The radio communication unit 210 is an element for performing radio communication with the user device UE, and has a configuration similar to that of the radio communication unit 110 of the user device UE. The network communication unit 220 is an element for performing communication with other nodes (the small base station PhNB, the switching center, etc.) in the network NW, and exchanges signals with the other nodes. The storage unit 230 stores information related to communication control. The controller 240 exchanges user signals and control signals and includes a transmitting unit 242 and an information notifying unit 244. The transmitting unit 242 transmits synchronization signals SS that indicate the physical cell identity PCI identifying the macro base station eNB, through the radio communication unit 210. The information notifying unit 244 notifies the user device of the synchronization state information and the frequency information through the radio communication unit 210. The controller 240 and the elements in the controller 240 are functional blocks accomplished by the fact that a CPU (not shown in the figure), provided in the macro base station eNB, executes a computer program stored in the storage unit 230 and operates in accordance with the computer program.

1(4)-3. Configuration of Small Base Station

Figure 10:
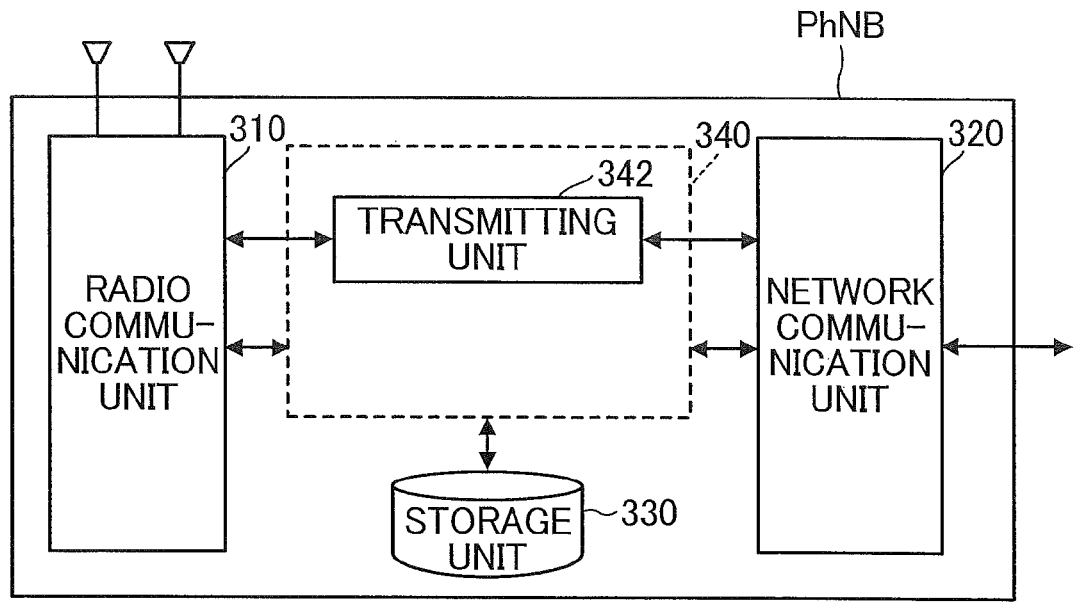
FIG. 10 is a block diagram showing a configuration of the small base station according to the first embodiment.

FIG. 10 is a block diagram showing a configuration of the small base station PhNB according to the first embodiment. The small base station PhNB includes a radio communication unit 310, a network communication unit 320, a storage unit 330, and a controller 340. The radio communication unit 310 is an element for performing radio communication with the user device UE and has a configuration similar to that of the radio communication unit 210 of the macro base station eNB. The network communication unit 320 is an element for performing communication with other nodes (the macro base station eNB, etc.) in the network NW, and exchanges signals with the other nodes. The storage unit 330 stores information related to communication control. The controller 340 exchanges user signals and control signals and includes a transmitting unit 342. The transmitting unit 342 transmits synchronization signals SS that indicate the physical cell identity PCI identifying the small base station PhNB, through the radio communication unit 310. The controller 340 and the elements in the controller 340 are functional blocks accomplished by the fact that a CPU (not shown in the figure), provided in the small base station PhNB, executes a computer program stored in the storage unit 330 and operates in accordance with the computer program.

1(5). Effect of Present Embodiment

According to the configuration of the present embodiment, the user device UE can, even without performing timing-search processing for the small base station PhNB, perform identifying processing to identify the physical cell identity PCI indicated by synchronization signals SS transmitted by the small base station PhNB, based on the transmission timing of synchronization signals SS at the macro base station eNB. As a result, because timing-search processing for the small base station PhNB is omitted, a processing load on the user device UE to recognize the small base station PhNB is reduced.

2. Second Embodiment

Description is next given of a second embodiment of the present invention. Regarding those elements for which actions and functions in each of the following embodiments are substantially the same as those in the first embodiment, reference numerals used in the above description are used, and descriptions of such elements are omitted, as appropriate.

In the first embodiment, the macro base station eNB and the small base station PhNB are synchronized with each other and transmit synchronization signals SS at the same time. In the second embodiment, as shown in FIG. 11, the small base station PhNB (the transmitting unit 342) transmits a synchronization signal SS at a transmission timing that is delayed from the transmission timing of synchronization signals SS at the macro base station eNB by the length of time that corresponds to a transmission offset value OV.

Figure 12:
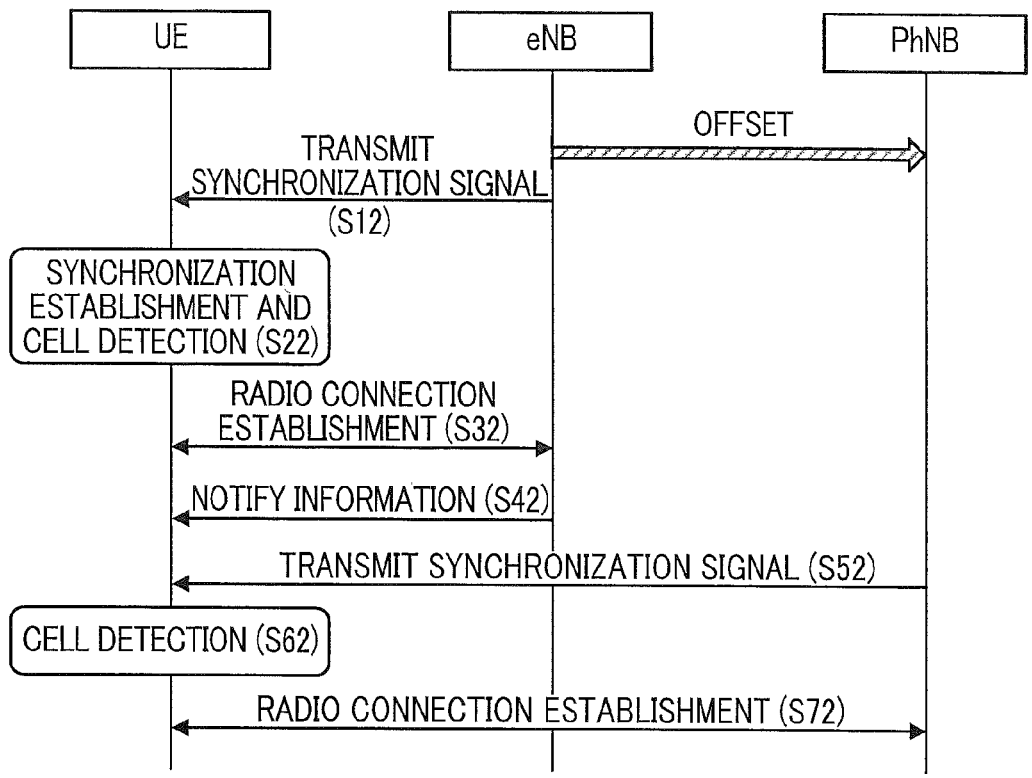
FIG. 12 is a diagram showing identifying processing to identify the physical cell identity of the small base station according to the second embodiment.

With reference to FIG. 12, identifying processing to identify the physical cell identity PCI of the small base station PhNB according to the present embodiment is described. Because cell detection and synchronization establishment that the user device UE performs for the macro base station eNB (steps S12 to S32) are similar to steps S10 to S30 in the first embodiment, descriptions thereof are omitted.

The macro base station eNB notifies the user device UE of the synchronization state information related to a synchronization state between the macro base station eNB and the small base station PhNB, which is located nearby, and of frequency information related to an identification signal frequency that the small base station PhNB uses to transmit synchronization signals SS (S42). In the second embodiment, because there is a time difference that corresponds to the transmission offset value OV between the transmission timing at the macro base station eNB and that at the small base station PhNB, the synchronization state information indicates the transmission offset value OV for the transmission timing at the macro base station eNB. The user device UE stores the received synchronization state information and the received frequency information.

Figure 11:
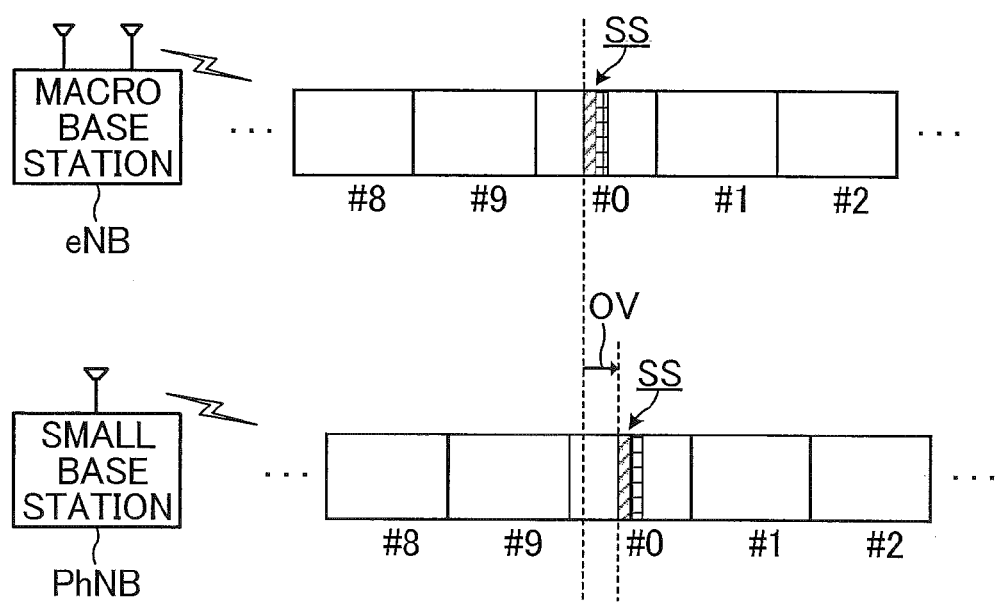
FIG. 11 is a diagram showing an example of radio signal transmission performed by a macro base station and a small base station according to a second embodiment.

The small base station PhNB periodically transmits a synchronization signal SS that indicates the physical cell identity PCI identifying the small base station PhNB at a transmission timing, such as the timing shown in FIG. 11 (S52). The user device UE, based on synchronization signals SS received from the small base station PhNB, performs cell detection (processing to identify the physical cell identity PCI that indicates the small base station PhNB) (S62). The cell detection described immediately above is performed using the synchronization state information (the transmission offset value OV) and the frequency information notified at step S42. More specifically, the user device UE, without performing timing-search processing for the small base station PhNB, performs detection processing, on the identification signal frequency that is indicated by the frequency information and is used by the small base station PhNB, to detect the local identity and the group identity based on the transmission timing of synchronization signals SS transmitted by the macro base station eNB and the transmission offset value OV. The user device UE then establishes a radio connection with the small base station PhNB (S72).

In the cell detection at step S62, the user device UE does not need to search for the location (transmission timing) of a synchronization signal SS included in a radio signal from the small base station PhNB. That is, the user device UE can omit the first phase of cell searching. This is enabled, as described above, by the fact that the user device UE can obtain the transmission timing of synchronization signals SS at the small base station PhNB by adding the transmission offset value OV to the transmission timing of synchronization signals SS at the macro base station eNB obtained at step S22, because there is a time difference that corresponds to the transmission offset value OV between the transmission timing at the macro base station eNB and that at the small base station PhNB.

The above configuration achieves technical effects similar to those of the first embodiment.

3. Third Embodiment

Description is next given of a third embodiment of the present invention. In the first embodiment, the macro base station eNB and the small base station PhNB are interconnected by an interface (optical fiber, etc.) that can transmit clock signals and are synchronized with each other. In the third embodiment, the small base station PhNB receives synchronization signals SS from the macro base station eNB to synchronize with the macro base station eNB.

Figure 13:
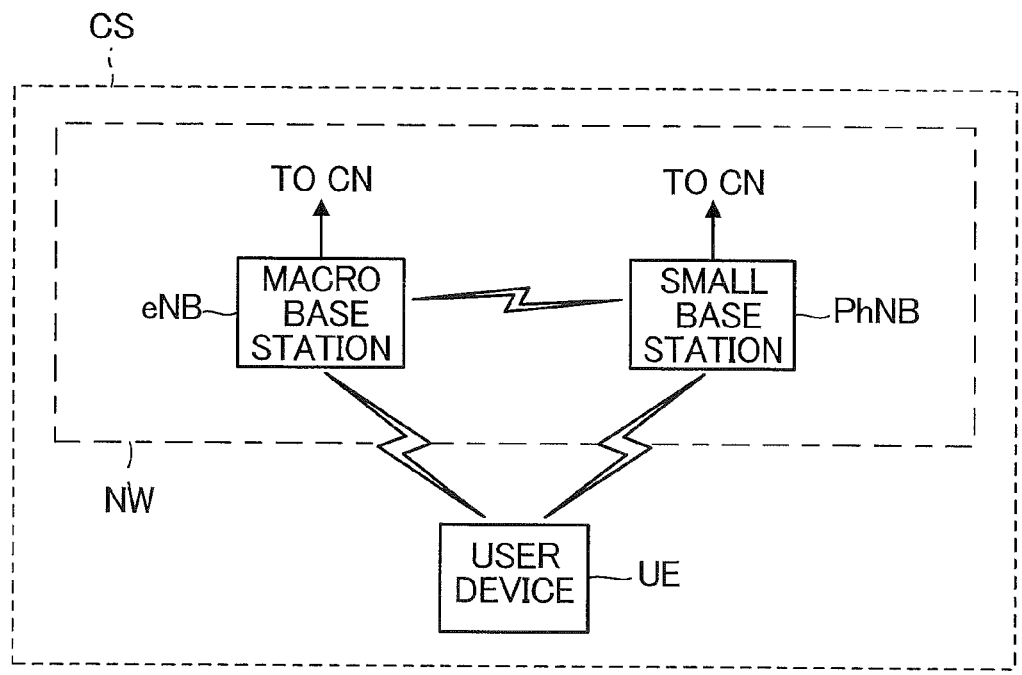
FIG. 13 is a block diagram showing a radio communication system according to a third embodiment.

FIG. 13 is a block diagram showing a radio communication system CS according to the third embodiment. The small base station PhNB receives synchronization signals SS from the macro base station eNB to detect the transmission timing so as to synchronize with the macro base station eNB. In the third embodiment, unlike in the first embodiment, a synchronization timing is delayed by the length of time required for radio signals transmitted by the macro base station eNB to reach the small base station PhNB and to be processed. The small base station PhNB of the third embodiment, therefore, advances the transmission timing of its synchronization signals SS according to the distance from the macro base station eNB.

Figure 14:
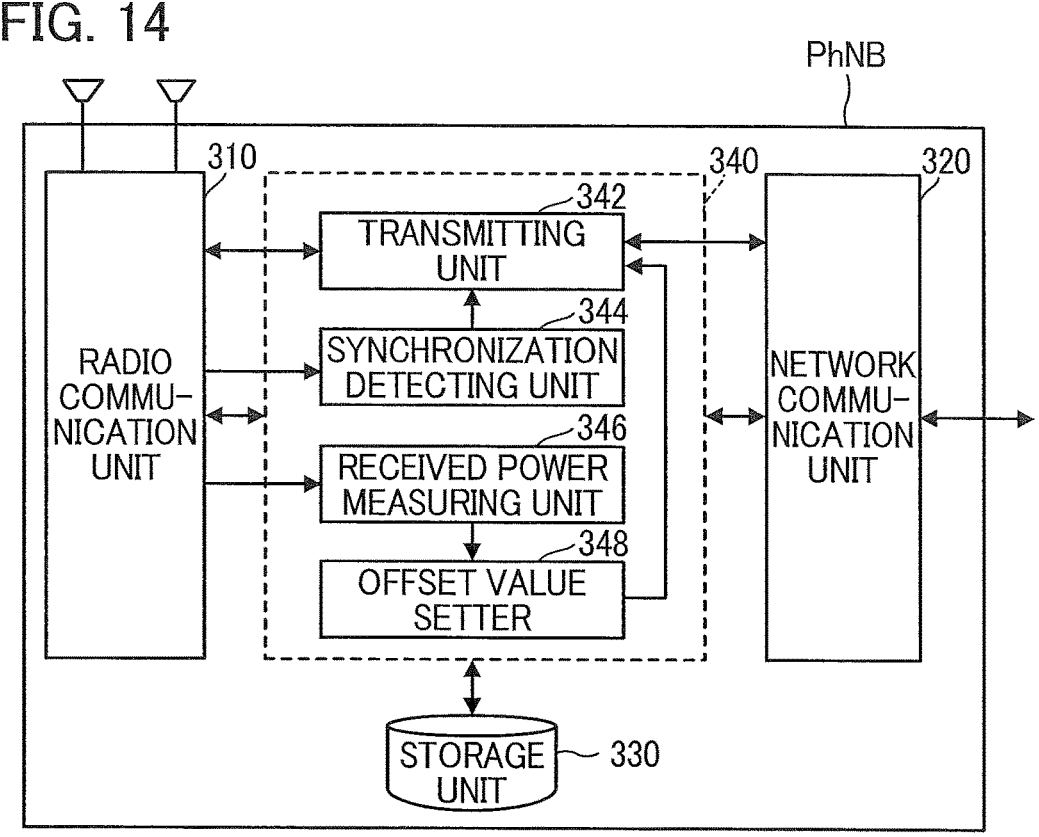
FIG. 14 is a block diagram showing a configuration of a small base station according to the third embodiment.

FIG. 14 is a block diagram showing a configuration of the small base station PhNB according to the third embodiment. The controller 340 of the small base station PhNB further includes a synchronization detecting unit 344, a received power measuring unit 346, and an offset value setter 348. The synchronization detecting unit 344, similarly to the cell searcher 132 of the user device UE in the embodiments described above, detects the transmission timing of synchronization signals SS transmitted by the macro base station eNB and provides it to the transmitting unit 342. The received power measuring unit 346 measures received power of radio signals (reference signals) received through the radio communication unit 310 from the macro base station eNB. The offset value setter 348 sets a transmission offset value OV so that the smaller the received power measured by the received power measuring unit 346 is, the larger the transmission offset value OV is. The offset value setter then provides the transmission offset value OV to the transmitting unit 342. The transmitting unit 342 transmits a synchronization signal SS of the small base station PhNB at a transmission timing that is advanced from the transmission timing at the macro base station eNB, the transmission timing at the macro base station eNB being provided from the synchronization detecting unit 344, by the length of time that corresponds to the transmission offset value OV provided from the offset value setter 348.

As will be understood from the above description, the smaller the received power of radio signals from the macro base station eNB, the earlier (the more advanced) transmission timing the small base station PhNB of the third embodiment uses to transmit radio signals (synchronization signals SS). Because radio signals attenuate as they travel through space, that the received power of radio signals received at the small base station PhNB from the macro base station eNB is small indicates that the distance from the macro base station eNB to the small base station PhNB is large. The small base station PhNB as described above, therefore, corrects (advances) its transmission timing according to the distance from the macro base station eNB. As a result, a difference between the transmission timing at the macro base station eNB and the transmission timing at the small base station PhNB is reduced.

4. Fourth Embodiment

Description is next given of a fourth embodiment of the present invention. In the first embodiment, the transmission timing at which the macro base station eNB transmits a synchronization signal SS and the transmission timing at which the small base station PhNB transmits a synchronization signal SS are synchronized with each other (FIG. 7). Because the 168 types of SSS's are not orthogonal to one another, when multiple SSS's are transmitted at the same transmission timing, they interfere with one another. When the user device UE performs cell searching for the small base station PhNB using the transmission timing at the macro base station eNB as described in the first embodiment (FIG. 6), the user device UE may not, depending on radio environment, etc., be able to identify the group identity (and therefore the physical cell identity PCI) with sufficient accuracy.

In light of the situation above, a small base station PhNB (transmitting unit 342) of the fourth embodiment transmits a cell-specific signal that includes a signal (identification signal) that indicates the physical cell identity PCI corresponding to the small base station PhNB. A cell-specific signal is a signal that is different from a synchronization signal SS; for example, a reference signal other than a synchronization signal SS. Examples of a reference signal include a CRS (Cell Specific Reference Signal), a CSI-RS (CSI Reference Signal), a PRS (Positioning Reference Signal), an MBSFN-RS (MBSFN Reference Signal), etc. Details of the above-mentioned reference signals are described in, for example, 3GPP TS 36.211 V10.1.0 (2011-03), Chapter 6.10, Reference signals. The CRS, for example, has six patterns of frequency shift, and therefore interference due to collision is reduced compared with the SSS. Furthermore, because the CRS has its symbols scattered over the entire system bandwidth, a higher correlation energy can be obtained when correlations are calculated, compared with the SSS. A freely chosen type of signal that indicates the physical cell identity PCI corresponding to the small base station PhNB may be used as a cell-specific signal.

In performing cell detection (step S60 in FIG. 6), the user device UE (cell searcher 132) identifies the physical cell identity PCI of the small base station PhNB indicated by the identification signal included in a cell-specific signal. A location (transmission timing) of a cell-specific signal is determined relative to a location (transmission timing) of a synchronization signal SS of the small base station PhNB. As stated above, the macro base station eNB and the small base station PhNB are synchronized and have a common transmission timing of synchronization signals SS. The user device UE (cell searcher 132) can therefore regard the transmission timing of synchronization signals SS at the macro base station eNB obtained at step S20 as the transmission timing of synchronization signals SS at the small base station PhNB, and can perform cell detection on a cell-specific signal such as described above. The user device UE (cell searcher 132) may perform cell detection on a combination of a synchronization signal SS and a cell-specific signal, or on a combination of multiple types of cell-specific signals.

According to the configuration of the present embodiment, because the user device UE can perform cell detection for the small base station PhNB using a cell-specific signal that is different from a synchronization signal SS, the user device UE can identify the group identity (physical cell identity PCI) with higher accuracy compared with a configuration in which the group identity (physical cell identity PCI) is identified using only SSS's which interfere with one another.

5. Fifth Embodiment

Description is next given of a fifth embodiment of the present invention. The fifth embodiment relates to details of cell searching for the small base station PhNB using a reference signal (CSI-RS). The macro base station eNB (information notifying unit 244) of the fifth embodiment transmits to the user device UE, in addition to the synchronization state information and the frequency information, information related to a configuration of a CSI-RS that the small base station PhNB transmits (reference signal configuration information; CSI-RS Configuration) and a CP length (cyclic prefix length) in radio communication performed by the small base station PhNB.

A CSI-RS is a reference signal sequence that is generated using various parameters that include a physical cell identity PCI. A radio resource (time and frequency) used to transmit a CSI-RS is not fixed and is determined independent of a physical cell identity PCI (refer to 3GPP TS 36.211 V10.1.0 (2011-March ), Chapter 6.10.1, Cell-specific reference signals). The reference signal configuration information indicates a radio resource that is used to transmit a CSI-RS.

A CP length is a time length of a cyclic prefix. A cyclic prefix is a guard interval that is inserted before a valid symbol to avoid effects by a delayed wave in OFDM radio communication. A CP length is either "normal" or "extended". A location of the SSS on a radio frame F (location relative to the PSS) is determined according to the CP length (not shown in FIGS. 3 and 7).

With reference to FIG. 6 again, cell searching for the small base station PhNB according to the present embodiment is described. Because establishment of a radio connection between the user device UE and the macro base station eNB (steps S10 to S30) is similar to that in the embodiments described above, descriptions thereof are omitted. The macro base station eNB (information notifying unit 244) notifies the user device UE, as described above, of synchronization state information, frequency information, reference signal configuration information, and CP length information (S40). The frequency information of the present embodiment indicates, as identification signal frequencies, a frequency that is used to transmit synchronization signals SS and a frequency that is used to transmit CSI-RS's.

The small base station PhNB periodically transmits a synchronization signal SS that indicates the physical cell identity PCI identifying the small base station PhNB and a CSI-RS such as described above (S50). The user device UE, based on synchronization signals SS and CSI-RS's received from the small base station PhNB, performs cell detection (S60). The cell detection mentioned immediately above is performed using the synchronization state information, the frequency information, the reference signal configuration information, and the CP length information. More specifically, when the synchronization state information indicates that "the macro base station eNB and the small base station PhNB are synchronized", the user device UE, without performing timing-search processing for the small base station PhNB, based on the transmission timing of synchronization signals SS transmitted by the macro base station eNB and the reference signal configuration information, performs detection processing, on the identification signal frequency that is indicated by the frequency information and is used by the small base station PhNB, to detect the local identity, the group identity, and a CSI-RS. The user device UE then establishes a radio connection with the small base station PhNB (S70). The operations described above can be used in the configuration of the second embodiment, in which the transmission timing at the small base station PhNB is offset. The above configuration can be used with a freely chosen type of signal that can be used to identify a cell (another reference signal, a signal for discovering a small cell (discovery signal), etc.).

Because the user device UE is notified of the reference signal configuration information by the macro base station eNB, the user device UE knows a radio resource that is used to transmit a CSI-RS. In the cell detection at step S60, therefore, the user device UE can perform detection processing to detect the CSI-RS (can calculate correlations between the CSI-RS transmitted by the small base station PhNB and replica signals stored in the user device UE). Because the user device UE is notified of the CP length information by the macro base station eNB, the user device UE knows a location of an SSS on a radio frame F (a location relative to a PSS). In the cell detection at step S60, therefore, the user device UE does not need to identify whether the location (transmission timing) of the SSS corresponds to the "normal" CP length or to the "extended" CP length.

The above configuration achieves technical effects similar to those of the first embodiment. Furthermore, because the user device UE performs cell detection for the small base station PhNB using a reference signal (CSI-RS), the user device UE can identify a cell with higher accuracy compared with a configuration in which cell detection is performed using only SSS's which interfere with one another. Even when the small base station PhNB has multiple transmission points and each of them is identified by a reference signal (CSI-RS), not only the small base station PhNB, but also each transmission point, can be identified according to the above configuration.

6. Sixth Embodiment

Description is next given of a sixth embodiment of the present invention. Synchronization between the macro base station eNB and the small base station PhNB may not always be accurate. A situation can be assumed in which the accuracy of synchronization between the macro base station eNB and the small base station PhNB is low. In such a case, even when the synchronization state information indicates that "the macro base station eNB and the small base station PhNB are synchronized" as in the first embodiment, in reality the transmission timing at which the macro base station eNB transmits a synchronization signal SS and the transmission timing at which the small base station PhNB transmits a synchronization signal SS may be out of synchronization.

In light of the situation above, the user device UE (cell searcher 132), instead of performing the first phase of cell searching (timing-search processing) for the small base station PhNB, performs detection processing (tracking processing) that is based on the transmission timing of synchronization signals SS transmitted by the macro base station eNB. More specifically, in the cell detection for the small base station PhNB (step S60 in FIG. 6), when the synchronization state information indicates that "the macro base station eNB and the small base station PhNB are synchronized", the user device UE performs timing-search processing over a predetermined period (that is, over a limited time period) that includes the transmission timing of synchronization signals SS transmitted by the macro base station eNB (e.g., 5 microseconds centering on the transmission timing at the macro base station eNB) so as to identify the transmission timing at the small base station PhNB, and then performs the cell detection described above.

The above-described situation can also arise in the second embodiment, in which the transmission timing at the small base station PhNB is offset. That is, when the accuracy of synchronization between the macro base station eNB and the small base station PhNB is low, a transmission timing that is delayed from the transmission timing at the macro base station eNB by the length of time that corresponds to the transmission offset value OV indicated by the synchronization state information (the calculated transmission timing at the small base station PhNB), and the actual transmission timing of synchronization signals SS transmitted by the small base station PhNB, may be out of synchronization.

The user device UE, therefore, in the cell detection for the small base station PhNB (step S62 in FIG. 12), performs timing-search processing over a predetermined period (that is, over a limited time period) that includes the transmission timing that is delayed from the transmission timing of synchronization signals SS transmitted by the macro base station eNB by the length of time corresponding to the transmission offset value OV (that is, the calculated transmission timing at the small base station PhNB) (e.g., performs timing-search processing over 5 microseconds centering on the calculated transmission timing at the small base station PhNB) so as to identify the transmission timing at the small base station PhNB, and then performs the cell detection described above.

The above configuration achieves technical effects similar to those of the embodiments described above even when the accuracy of synchronization between the macro base station eNB and the small base station PhNB is low.

7. Seventh Embodiment

Figure 15:
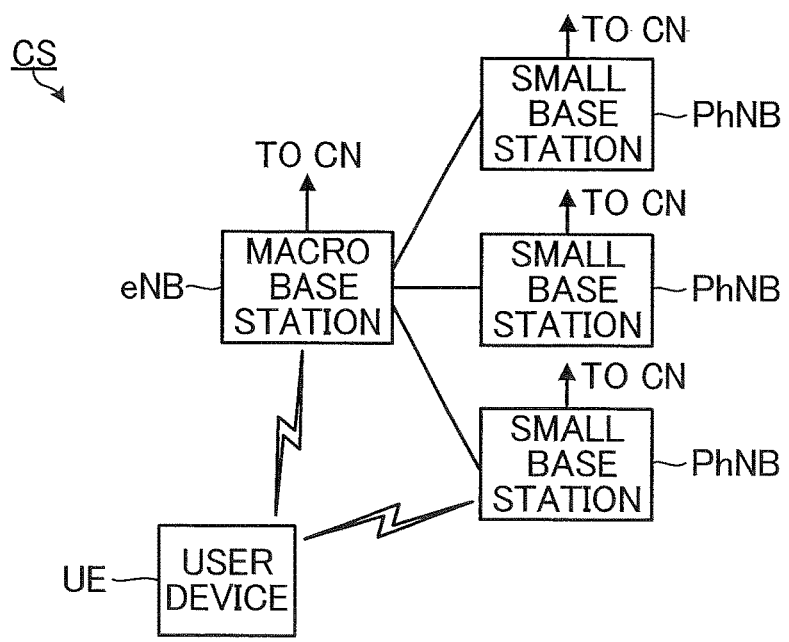
FIG. 15 is a block diagram showing a radio communication system according to a seventh embodiment.

Description is next given of a seventh embodiment of the present invention. In the seventh embodiment, as shown in FIG. 15, a situation is assumed in which there are multiple small base stations PhNB under a macro base station eNB. These small base stations PhNB are synchronized with the macro base station eNB to which the small base stations PhNB are connected.

Figure 16:
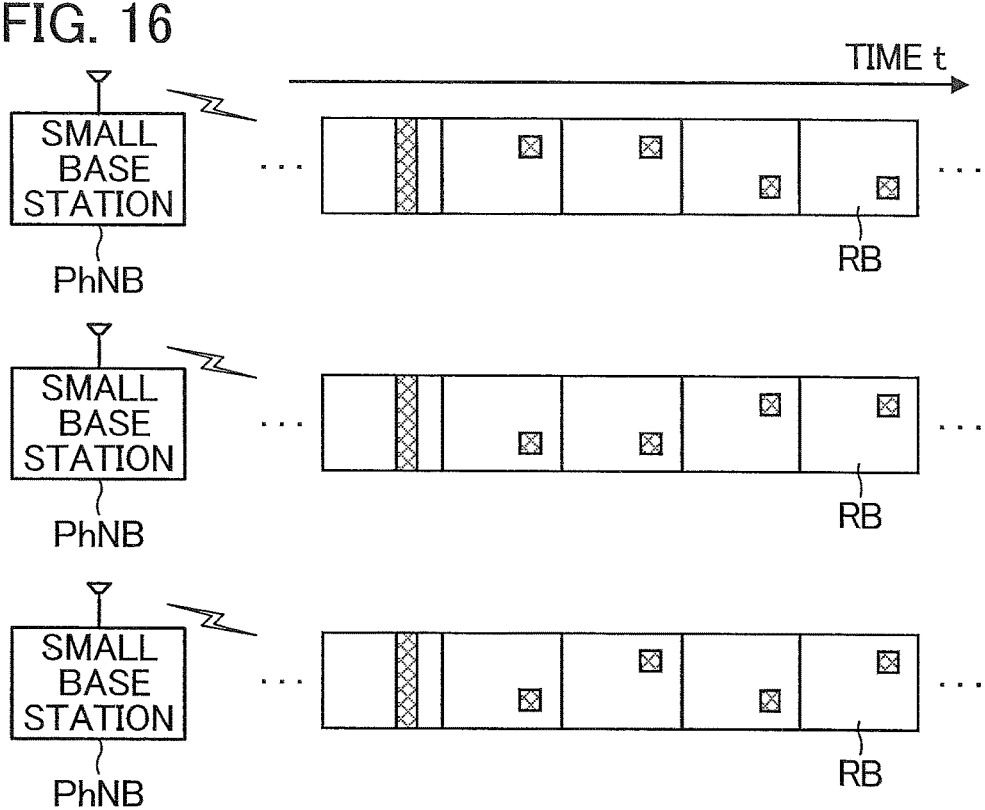
FIG. 16 is a diagram showing reference signals in the seventh embodiment.

As shown in FIG. 16, the small base stations PhNB transmit common reference signals (e.g., CSI-RS) at the same transmission timing. These reference signals are synchronization reference signals for the user device UE to establish synchronization with the small base stations PhNB. Additionally, as shown in FIG. 16, the small base stations PhNB transmit reference signals (e.g., CSI-RS) that are different in transmission timing or in sequence. These reference signals are identification reference signals for the user device UE to identify each of the small base stations PhNB.

Taking into consideration that the macro base station eNB and the small base stations PhNB are synchronized, it may be the macro base station eNB alone that transmits the synchronization reference signals. In this case, each of the small base stations PhNB transmits at least identification reference signals that identify itself.

According to the above configuration, by the use of common synchronization reference signals, the user device UE can detect synchronization with the small base stations PhNB simultaneously. Furthermore, because the small base stations PhNB transmit different identification reference signals, the user device UE can identify each of the small base stations PhNB.

8. Eighth Embodiment

Figure 17:
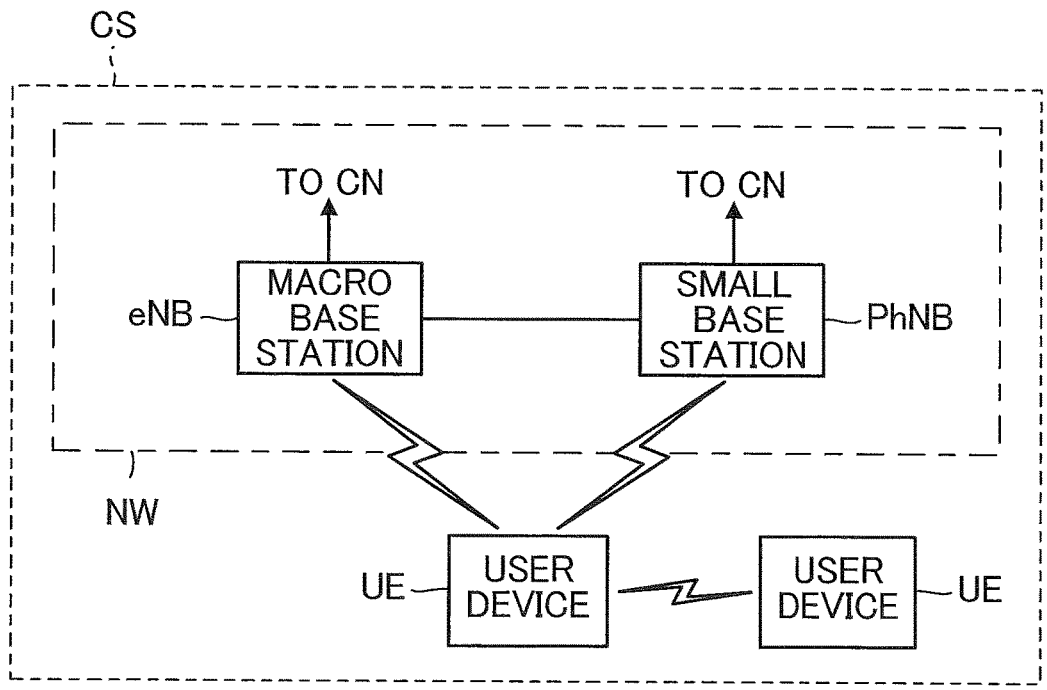
FIG. 17 is a block diagram showing a radio communication system according to an eighth embodiment.
Figure 18:
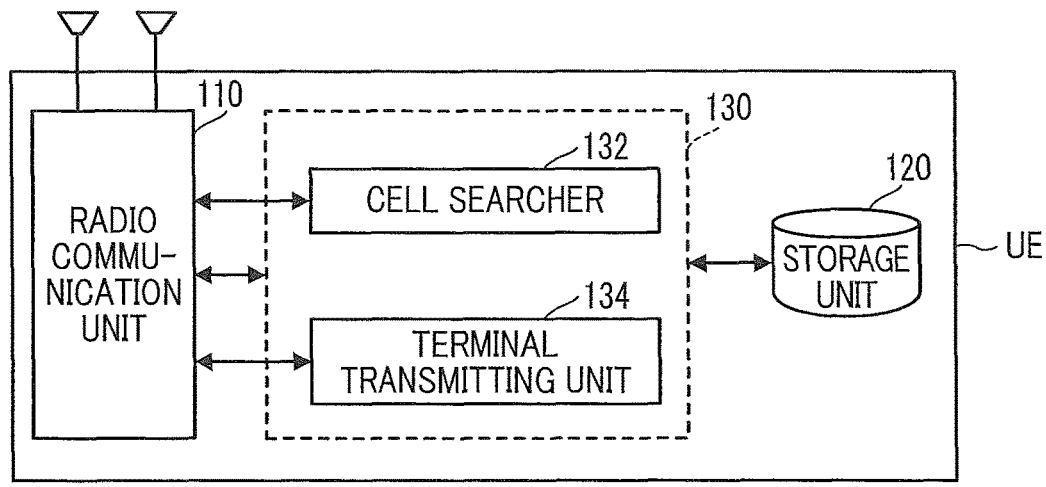
FIG. 18 is a block diagram showing a configuration of a user device according to the eighth embodiment.

Description is next given of an eighth embodiment of the present invention. In the eighth embodiment, as shown in FIG. 17, a user device UE performs radio communication directly with another user device UE in the radio communication system CS. FIG. 18 is a block diagram showing a configuration of the user device UE according to the eighth embodiment. The controller 130 of the user device UE further includes a terminal transmitting unit 134 that transmits a terminal discovery signal that indicates a terminal identifier that identifies the user device.

Figure 19:
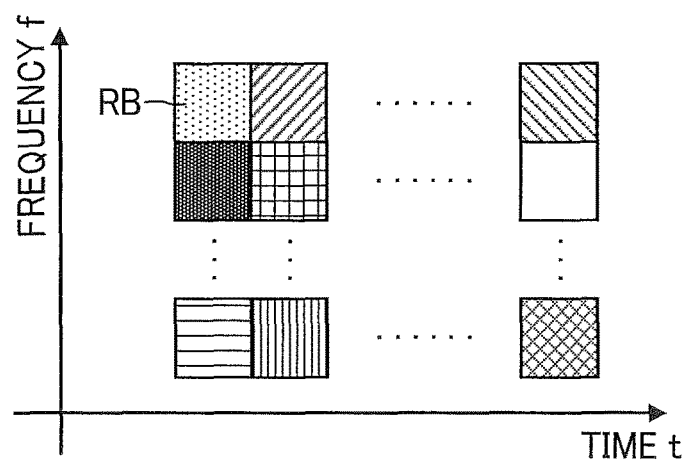
FIG. 19 is a diagram showing terminal discovery signals transmitted by user devices of the eighth embodiment.

FIG. 19 is a diagram showing terminal discovery signals transmitted by multiple user devices UE. A user device UE (terminal transmitting unit 134) transmits a terminal discovery signal using a resource block RB that is allocated to the user device UE. In FIG. 19, different hatching patterns on resource blocks RB correspond to different user devices UE. In the eighth embodiment, a terminal discovery signal is an uplink signal that is transmitted using SC-FDMA. Because signals from a user device UE are transmitted using a single-carrier, a peak-to-average power ratio (PAPR) can be lowered.

Figure 20:
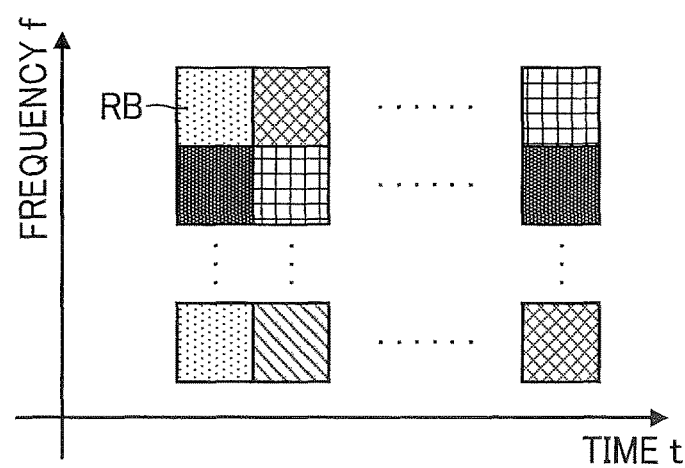
FIG. 20 is a diagram showing identification signals transmitted by small base stations of the eighth embodiment.

FIG. 20 is a diagram showing identification signals that small base stations PhNB transmit. A small base station PhNB (transmitting unit 342), using multiple resource blocks RB, transmits identification signals that have a common signal format with terminal discovery signals transmitted by a user device UE. Having "a common signal format" indicates that identification signals and terminal discovery signals have common characteristics such as signal length, the number of signal sequences that can be chosen, and modulation-demodulation method for signal exchange.

In FIG. 20, hatching patterns on resource blocks RB vary for different transmission-source small base stations PhNB. As will be understood from FIG. 20, multiple resource blocks RB can be transmitted on a single time axis or on a single frequency axis. According to the above configuration, by the use of multiple resource blocks RB, a time-domain or frequency-domain diversity effect can be obtained.

In the eighth embodiment, identification signals that small base stations PhNB transmit are preferably transmitted using SC-FDMA. Additionally, the identification signals are preferably transmitted using a frequency band that can be used by user devices UE to receive signals. When a small base station PhNB uses different frequencies for uplink and downlink communication (i.e., FDD is used), therefore, the small base station PhNB may transmit identification signals by SC-FDMA using a downlink frequency. In the case in which multiple resource blocks RB are transmitted on a single frequency axis, multiple single-carriers may be used to transmit identification signals. When a small base station PhNB uses a common frequency for uplink and downlink communication (i.e., TDD is used), the small base station PhNB may transmit identification signals using the common frequency.

Identification signals may be transmitted using a dedicated radio resource. Transmission of signals other than identification signals is preferably stopped for a dedicated radio resource.

According to the configuration above, terminal discovery signals used to detect a user device UE and identification signals used to detect a small base station PhNB have a common signal format. The user device UE can, therefore, perform detection of a small base station PhNB and perform detection of another user device UE, using a single mechanism.

9. Ninth Embodiment

Description is next given of a ninth embodiment of the present invention. In the fifth embodiment, cell detection for a small base station PhNB is performed using a reference signal (CSI-RS). In the ninth embodiment, cell detection for a small base station PhNB is performed based on a hopping pattern (identification signal pattern) formed by multiple CSI-RS's.

A small base station PhNB (transmitting unit 342) of the ninth embodiment transmits CSI-RS's according to a hopping pattern that is unique to the small base station PhNB. A hopping pattern indicates a configuration of CSI-RS's in each of multiple subframes SF. The user device UE can identify the small base station PhNB based on the configuration (hopping pattern) of CSI-RS's over subframes SF.

Figure 21:
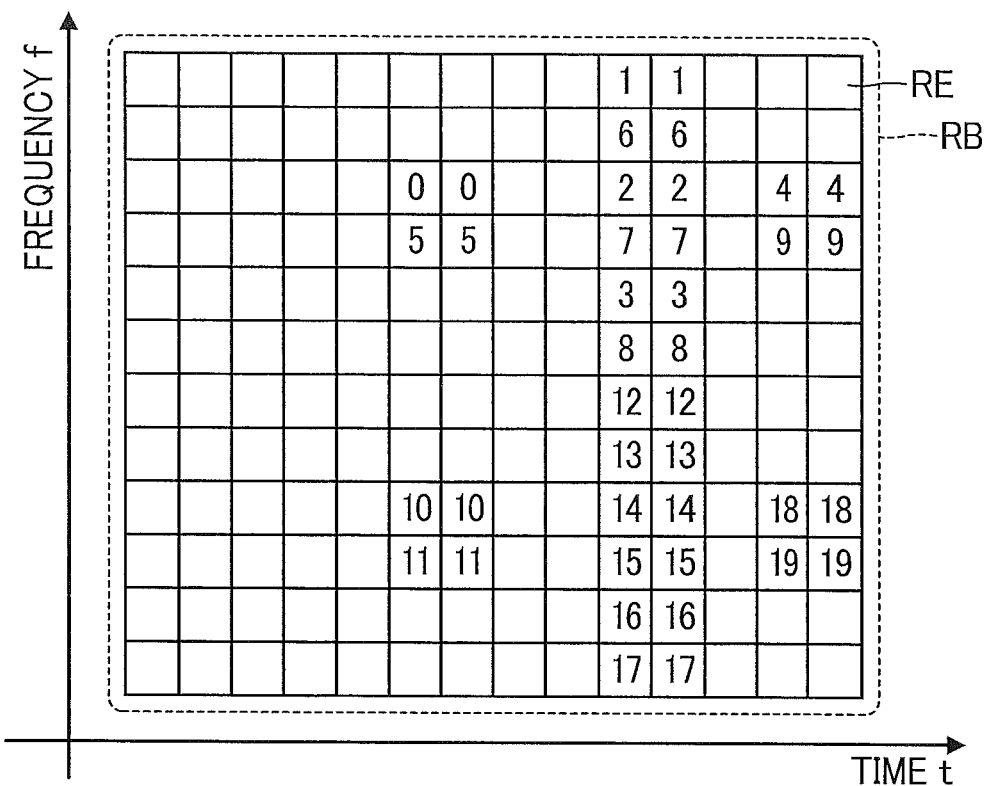
FIG. 21 is a diagram showing a configuration of CSI-RS's in a resource block in a ninth embodiment.

FIG. 21 is a diagram showing a configuration of CSI-RS's in a resource block RB. A resource block RB includes resource elements RE. From among resource elements RE that are assigned with numbers ranging from 0 to 19 (RE#0 to RE#19) in FIG. 21, CSI-RS's are transmitted using resource elements RE corresponding to at least one of the numbers. There may be resource blocks RB that are not used to transmit CSI-RS's.

Figure 22:
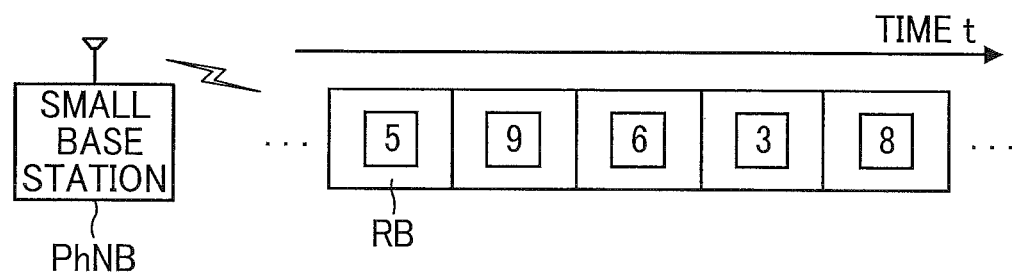
FIG. 22 is a diagram showing an example of a hopping pattern in the ninth embodiment.

FIG. 22 is a diagram showing an example of a hopping pattern. The small base station PhNB, as shown in the figure, transmits CSI-RS's in the order (hopping pattern) of RE#5, RE#9, RE#6, RE#3, and RE#8. The user device UE has been notified by the macro base station eNB of hopping patterns that small base stations PhNB use. The user device UE can therefore identify each of the small base stations PhNB by detecting the hopping patterns.

A cycle of a hopping pattern may be equal to a conventional cycle of CSI-RS's (e.g., 80 ms), or may be different; for example, a cycle may be set to be equal to the integral multiple of a conventional cycle of CSI-RS's.

In the ninth embodiment, similarly to the seventh embodiment, small base stations PhNB may transmit common CSI-RS's for a synchronization purpose, and each of the small base stations PhNB may transmit different CSI-RS's for an identification purpose.

According to the configuration above, a greater number of small base stations PhNB can be installed because more identification patterns are provided, compared with a configuration in which small base stations PhNB are identified based only on resource elements RE that are used to transmit CSI-RS's.

10. Modifications

The above-illustrated embodiments can be modified in various ways. Specific modifications are illustrated below. Two or more of the freely selected ones of the above embodiments and the following illustrations can be combined, as appropriate, so long as the modifications are not adopted in such a way that they conflict.

10(1). Modification 1

Although the radio communication system CS (the network NW) in the above embodiments is a heterogeneous network that includes a macro base station eNB and a small base station PhNB, a homogeneous network that includes base stations of a single type (e.g., macro base station eNB) alone may be adopted. In this case, the number of frequency band used may be one.

10(2). Modification 2

In the above embodiments, a macro base station eNB and a small base station PhNB are synchronized through an interface, such as optical fiber etc., that can transmit clock signals, or through a radio interface. A method can be chosen freely, however, for a macro base station eNB and a small base station PhNB to establish synchronization. For example, a macro base station eNB and a small base station PhNB may establish synchronization based on time indicated by radio waves transmitted by a GPS satellite (GPS signals).

10(3). Modification 3

The macro base station eNB (information notifying unit 244) may notify the user device UE of an identity list that indicates physical cell identities PCI of small base stations PhNB that are located around the macro base station eNB, by adding the identity list to the synchronization state information (step S40 and step S42). The user device UE (cell searcher 132) may perform cell detection (calculate correlations with replica signals) with respect to the small base stations PhNB corresponding to the physical cell identities PCI indicated by the notified identity list (step S60 and step S62). In this case, because the number of physical cell identities PCI for which the user device UE is to perform cell detection is limited, a processing load on the user device UE is even further reduced.

10(4). Modification 4

In the embodiments above, a small base station PhNB is identified using a physical cell identity PCI. An identifier to identify a small base station PhNB, however, may be freely chosen. An identifier may be used that is dedicated to identify a small base station PhNB and is different from a physical cell identity PCI.

10(5). Modification 5

There can be multiple small base stations PhNB under a macro base station eNB. When there are multiple small base stations PhNB, these small base stations PhNB may synchronize with one another to transmit synchronization signals SS, or may transmit synchronization signals SS based on different transmission offset values OV. When the small base stations PhNB transmit synchronization signals SS based on different transmission offset values OV, the macro base station eNB (information notifying unit 244) notifies the user device UE of each of the transmission offset values OV as the synchronization state information.

10(6). Modification 6

For a single small base station PhNB or transmission point, a single piece of reference signal configuration information (CSI-RS Configuration) may be set, or multiple pieces of reference signal configuration information may be set. When multiple pieces of reference signal configuration information are set for a single small base station PhNB or transmission point, a cell can be identified with higher accuracy compared with a situation in which a single piece of reference signal configuration information is set.

10(7). Modification 7

In the sixth embodiment, the user device UE performs cell searching (timing-search processing) using synchronization signals SS. Alternatively, the user device UE can perform cell searching (timing-search processing) using freely chosen signals that are transmitted periodically. For example, the reference signals that are described in the fourth embodiment (CRS, CSI-RS, PRS, MBSFN-RS, etc.) can be used for cell searching. Cell searching may be performed using a combination of synchronization signals SS and at least one type of the reference signals mentioned above or using a combination of multiple types of reference signals.

10(8). Modification 8

Figure 23:
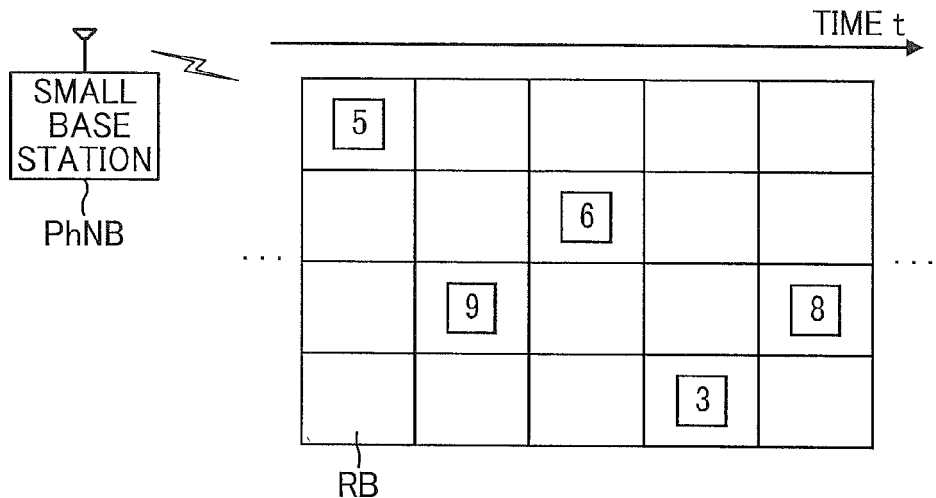
FIG. 23 is a diagram showing an example of a modification to the hopping pattern.

With respect to the ninth embodiment, as shown in FIG. 23, a hopping pattern may be used in which resource blocks RB that are used to transmit CSI-RS's, as well as resource elements RE in a subframe SF, hop. According to the configuration above, a greater number of small base stations PhNB can be installed because more hopping patterns are provided.

10(9). Modification 9

Figure 24:
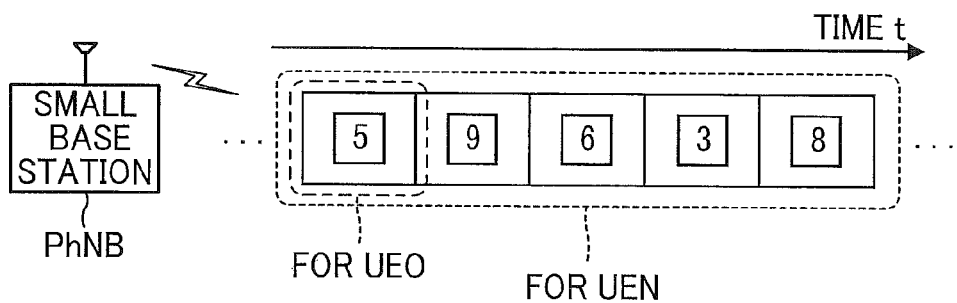
FIG. 24 is a diagram showing a modification in which a new-version user device and an old-version user device coexist.

In the ninth embodiment, as shown in FIG. 24, there may coexist a new-version user device UEN and an old-version user device UEO, the new-version user device UEN identifying a small base station PhNB using a hopping pattern of CSI-RS's ("FOR UEN" in FIG. 24), the old-version user device UEO identifying a small base station PhNB based only on resource elements RE that are used to transmit CSI-RS's ("FOR UEO" in FIG. 24).

10(10). Modification 10

The user device UE is a freely chosen device that can perform radio communication with the macro base station eNB and the small base station PhNB. The user device UE may be a cell phone terminal, e.g., a feature phone or a smart phone, a desktop type personal computer, a laptop personal computer, a UMPC (ultra-mobile personal computer), a portable game machine, or another type of radio terminal.

10(11). Modification 11

In each of the elements in the radio communication system CS (the user device UE, the macro base station eNB, and the small base station PhNB), functions executed by the CPU may instead be executed by hardware or by a programmable logic device, such as an FPGA (Field Programmable Gate Array) and a DSP (Digital Signal Processor).

DESCRIPTION OF REFERENCE SIGNS

UE: User Device
110: Radio Communication Unit
120: Storage Unit
130: Controller
132: Cell Searcher
eNB: Macro Base Station
210: Radio Communication Unit
220: Network Communication Unit
230: Storage Unit
240: Controller
242: Transmitting Unit
244: Information Notifying Unit
PhNB: Small Base Station
310: Radio Communication Unit
320: Network Communication Unit
330: Storage Unit
340: Controller
342: Transmitting Unit
344: Synchronization Detecting Unit
346: Received Power Measuring Unit
348: Offset Value Setter
C: Cell
C1: Macro Cell
C2: Small Cell
CS: Radio Communication System
F: Radio Frame
NW: Network
OV: Transmission Offset Value
PCI: Physical Cell Identity
SF: Subframe
SS: Synchronization Signal

The invention claimed is:
1. A radio communication system comprising:
base stations that include a first base station and a second base station, the first base station performing radio communication using a first frequency band and covering a first cell that is identified by a first cell identity, the second base station performing radio communication using a second frequency band and covering a second cell that is identified by a second cell identity; and
a user device that performs radio communication with each of the base stations,
wherein the first base station includes:
a first transmitting unit that transmits, at a first transmission timing, a first synchronization signal that corresponds to the first cell identity, which identifies the first cell covered by the first base station,
wherein the second base station includes:
a second transmitting unit that transmits an identification signal that corresponds to the second cell identity, which identifies the second cell covered by the second base station,
wherein the user device includes:
a cell searcher that detects the first transmission timing based on the first synchronization signal received from the first base station and performs timing-search processing that establishes synchronization with the first base station,
wherein the first base station further includes:
an information notifying unit that notifies the user device of synchronization state information related to a synchronization state between the first base station and the second base station and of frequency information related to an identification signal frequency that the second base station uses to transmit the identification signal, the identification signal frequency being included in the second frequency band, and
wherein the cell searcher of the user device, based on the synchronization state information from the first base station, performs identifying processing on the identification signal frequency indicated by the frequency information to identify the second cell identity corresponding to the identification signal.

2. The radio communication system according to claim 1, wherein the first base station and the second base station are synchronized with each other to perform radio communication,
wherein the second transmitting unit of the second base station transmits a second synchronization signal at a second transmission timing,
wherein the synchronization state information, which is notified by the information notifying unit of the first base station, indicates whether the first base station and the second base station are synchronized, and
wherein when the synchronization state information indicates that the first base station and the second base station are synchronized, the cell searcher of the user device, without performing timing-search processing for the second base station, performs identifying processing, based on the first transmission timing, to identify the second cell identity corresponding to the identification signal.

3. The radio communication system according to claim 2, wherein the synchronization state information further includes an identity list that indicates second cell identities that correspond to second base stations, and wherein the cell searcher of the user device performs the identifying processing only for the second base stations, which correspond to the second cell identities indicated by the identity list.

4. The radio communication system according to claim 1, wherein the first base station and the second base station are synchronized with each other to perform radio communication,
wherein the second transmitting unit of the second base station transmits a second synchronization signal at a second transmission timing,
wherein the synchronization state information, which is notified by the information notifying unit of the first base station, indicates whether the first base station and the second base station are synchronized, and
wherein when the synchronization state information indicates that the first base station and the second base station are synchronized, the cell searcher of the user device identifies the second transmission timing by performing timing-search processing for the second base station over a predetermined period that includes the first transmission timing and performs identifying processing based on the second transmission timing to identify the second cell identity corresponding to the identification signal.

5. The radio communication system according to claim 1, wherein the second transmitting unit of the second base station transmits the identification signal at a second transmission timing, the second transmission timing being a timing that is delayed from the first transmission timing at the first base station by a length of time that corresponds to a transmission offset value,
wherein the synchronization state information, which is notified by the information notifying unit of the first base station, indicates the transmission offset value for the first transmission timing at the first base station, and
wherein the cell searcher of the user device, without performing timing-search processing for the second base station, performs identifying processing, based on the first transmission timing and the transmission offset value indicated by the synchronization state information, to identify the second cell identity corresponding to the identification signal.

6. The radio communication system according to claim 1, wherein the second transmitting unit of the second base station transmits the identification signal at a second transmission timing, the second transmission timing being a timing that is delayed from the first transmission timing at the first base station by a length of time that corresponds to a transmission offset value,
wherein the synchronization state information, which is notified by the information notifying unit of the first base station, indicates the transmission offset value for the first transmission timing at the first base station, and
wherein the cell searcher of the user device identifies the second transmission timing by performing timing-search processing for the second base station over a predetermined period that includes a transmission timing that is delayed from the first transmission timing by the length of time that corresponds to the transmission offset value indicated by the synchronization state information and performs identifying processing based on the second transmission timing to identify the second cell identity corresponding to the identification signal.

7. The radio communication system according to claim 1, wherein the second base station further includes:

a received power measuring unit that measures received power of radio signals received from the first base station; and an offset value setter that sets a transmission offset value so that the transmission offset value increases as the received power measured by the received power measuring unit decreases, wherein the second transmitting unit of the second base station transmits the identification signal at a second transmission timing, the second transmission timing being a timing that is advanced from the first transmission timing at the first base station by a length of time that corresponds to the transmission offset value, wherein the synchronization state information, which is notified by the information notifying unit of the first base station, indicates whether the first base station and the second base station are synchronized, and wherein when the synchronization state information indicates that the first base station and the second base station are synchronized, the cell searcher of the user device, without performing timing-search processing for the second base station, performs identifying processing based on the first transmission timing to identify the second cell identity corresponding to the identification signal.

8. The radio communication system according to claim 1, wherein the user device further includes a terminal transmitting unit that transmits a terminal discovery signal that indicates a terminal identifier that identifies the user device, and wherein the second transmitting unit of the second base station transmits the identification signal that has a common signal format with the terminal discovery signal.

9. The radio communication system according to claim 1, wherein the second transmitting unit of the second base station transmits the identification signal in accordance with an identification signal pattern, the identification signal pattern indicating a configuration of the identification signal in each of subframes and identifying the second base station.

10. A communication control method in a radio communication system that comprises:

base stations that include a first base station and a second base station, the first base station performing radio communication using a first frequency band and covering a first cell that is identified by a first cell identity, the second base station performing radio communication using a second frequency band and covering a second cell that is identified by a second cell identity; and a user device that performs radio communication with each of the base stations, the communication control method comprising:

in the first base station, transmitting, at a first transmission timing, a first synchronization signal that corresponds to the first cell identity, which identifies the first cell covered by the first base station, in the second base station, transmitting an identification signal that corresponds to the second cell identity, which identifies the second cell covered by the second base station, in the user device, detecting the first transmission timing based on the first synchronization signal received from the first base station and performing timing-search processing that establishes synchronization with the first base station, in the first base station, notifying the user device of synchronization state information related to a synchronization state between the first base station and the second base station and of frequency information related to an identification signal frequency that the second base station uses to transmit the identification signal, the identification signal frequency being included in the second frequency band, and in the user device, using the synchronization state information from the first base station, performing identifying processing on the identification signal frequency indicated by the frequency information to identify the second cell identity corresponding to the identification signal.

* * * * *